United States Patent [19]
Moody et al.

[11] 3,756,410
[45] Sept. 4, 1973

[54] SEWAGE DISPOSAL EFFLUENT PURIFIER

[75] Inventors: Dwight L. Moody; Vincent R. Troglione, both of Meadville, Pa.

[73] Assignee: Moody Aquamatic Systems, Inc., Meadville, Pa.

[22] Filed: Nov. 8, 1971

[21] Appl. No.: 196,550

[52] U.S. Cl. ................. 210/139, 210/220, 210/242, 210/263, 210/305, 210/307
[51] Int. Cl. ............................................. B01d 33/00
[58] Field of Search ...................... 210/63, 103, 104, 210/242, 220, 221, 305, 307, 320, 139, 263

[56] References Cited
UNITED STATES PATENTS

| | | | |
|---|---|---|---|
| 782,021 | 2/1905 | Friberg | 210/63 |
| 3,327,855 | 6/1967 | Watson et al. | 210/220 X |
| 3,054,602 | 9/1962 | Proudman | 210/220 X |
| 3,680,704 | 8/1972 | Schaefer | 210/220 X |

*Primary Examiner*—John Adee
*Attorney*—B. Edward Shlesinger, Phillip K. Fitzsimmons et al.

[57] ABSTRACT

Liquid sewage, which preferably has been subjected to a primary sewage treatment phase to minimize its turbidity, is fed to a contact tank where it passes through a porous filter that removes any remaining solids, and then has ozone gas bubbled through it to oxidize impurities in the liquid and to remove objectionable odors. An ozone gas diffuser is mounted in the tank beneath the filter so that any excess ozone gas will pass upwardly through the filter to keep it purified. A plurality of ozone generators are used to supply the ozone gas continuously to the tank; and a stepper switch automatically and successively energizes the generators one by one in a continuous cycle.

9 Claims, 6 Drawing Figures

PATENTED SEP 4 1973 3,756,410

INVENTORS
DWIGHT L. MOODY
VINCENT R. TROGLIONE
BY
Shlesinger, Fitzsimmons & Shlesinger
ATTORNEYS

INVENTORS
DWIGHT L. MOODY
BY VINCENT R. TROGLIONE

ATTORNEYS

SEWAGE DISPOSAL EFFLUENT PURIFIER

This invention relates to water purification, and more particularly to apparatus for purifying the effluent of a sewage disposal system.

Most sewage treating systems, from the simple septic tank to the largest of municipal sewage treating plants, produce liquid effluents, which, although nearly free of solids, nevertheless may still contain high concentrations of impurities. A multi-stage sewage treating system, for example, may reduce the turbidity of liquid sewage to the point where, although seemingly crystal clear, the sewage may still be highly polluted and malodorous because of unseen impurities. It is essential that these impurities be removed before the sewage is discharged into an outfall such as a stream, lake, or the like.

Heretofore it has been commonplace to treat sewage effluent of the type described with chlorine to reduce the objectionable bacteria count and noxious odors. It has been found, however, that this chlorination process has not been completely satisfactory, since chlorine in fact is not powerful enough completely to kill or remove many undesirable impurities in the effluent.

It is an object of this invention to provide for a sewage treatment system of the continuous flow variety improved apparatus for purifying the system effluent by destroying or removing impurities, such as virus, bacteria, detergents, phenols, cyanides, oils, solid wastes, etc., containing in the effluent.

A further object of this invention is to provide improved purifying apparatus of the type described, which utilizes both a mechanical filtering system and a chemical reaction process for removing impurities from liquid sewage.

Still another object of this invention is to provide apparatus of the type described in which ozone gas is bubbled into a container of liquid sewage effluent to oxidize the contaminants of both the effluent and the porous filter through which the effluent passes upon entry into the container.

Another object of this invention is to provide for a sewage treatment system of the continuous flow variety, apparatus for subjecting the system effluent to an ozonation process through the use of a plurality of ozone generators that are automatically operated successively in a continuous cycle.

Other objects of the invention will be apparent hereinafter from the specification and from the recital of the appended claims, particularly when read in conjunction with the accompanying drawings.

Figure 1:
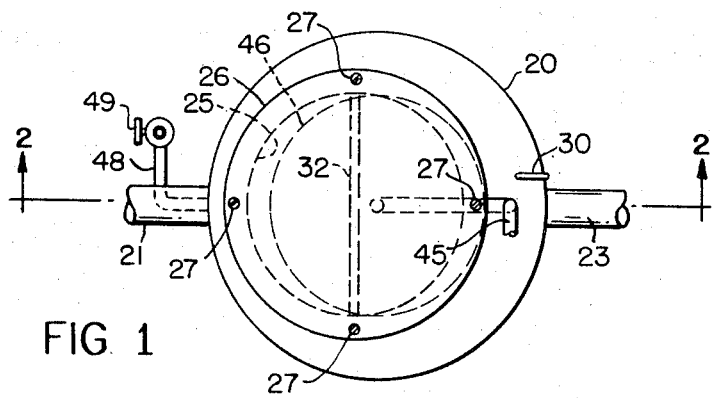
FIG. 1 is a fragmentary plan view of apparatus made in accordance with one of the embodiments of this invention for purifying the effluent of a sewage treatment system.
Figure 2:
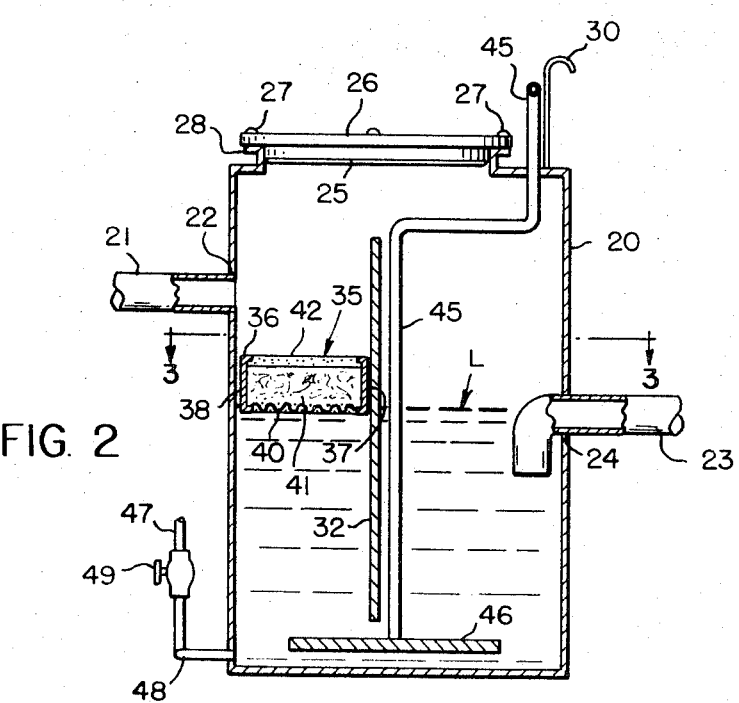
FIG. 2 is a fragmentary sectional view taken along the line 2—2 in FIG. 1 looking in the direction of the arrows, with portions of the apparatus being shown in full.

Referring now to the drawings by numerals of reference, and first to the embodiment illustrated in FIGS. 1 to 3, 20 denotes a cylindrical tank, which communicates through an opening 22 adjacent its upper end with a sewage inlet pipe 21, and intermediate its ends through an opening 24 with an outlet or discharge pipe 23. Opening 24 and the outlet pipe 23 are located beneath and opposite the opening 22 and the inlet pipe 21; and the inner end of pipe 23 may extend downwardly toward the bottom of the tank as shown in FIG. 2.

Tank 20 may be made of concrete (poured or prestressed), Fiberglas, steel, aluminum, polyvinyl chloride (PVC), or the like, and has its inlet pipe 21 connected to a sewage disposal system to receive liquid sewage therefrom. The sewage entering tank 20 through the pipe 21 preferably has already been subjected to a primary sewage treatment, so that most of the solid particles have already been removed from the liquid before it enters tank 20.

In its upper end tank 20 has a circular opening 25, which is slightly smaller than the inside diameter of tank 20, and which is slightly offset from the center of the tank. Opening 25 is sealed by a removable, circular cover 26, which is releasably and sealingly secured around its marginal edge by screws 27, or the like, to a circumferential flange 28, which is formed on the upper end of tank 20 around its opening 25. A small vent pipe 30 is secured at its lower end in an opening in the top of tank 20 adjacent cover 26, thereby to vent the interior of the tank to atmosphere so that liquid may flow into the tank through pipe 21, and out of the tank through pipe 23 in known manner.

Mounted in tank 20 to extend transversely across the inner or discharge end of the inlet pipe 21 is a rigid plate or baffle 32, which may be made of Fiberglas, PVC, aluminum or similar material. Opposite side edges of baffle 32 are secured with contact cement, silicon rubber seals, or the like, in registering vertical slots 33 (FIG. 3) that are formed on the inside wall of tank 20 to support the baffle in a vertical plane that extends normal to the axis of pipe 21, and which is offset slightly from the axial centerline of tank 20 in the direction of pipe 21. The bottom or lower edge of the baffle is positioned slightly above the bottom of the tank 20; and its upper edge projects slightly above the inlet opening 22.

Figure 3:
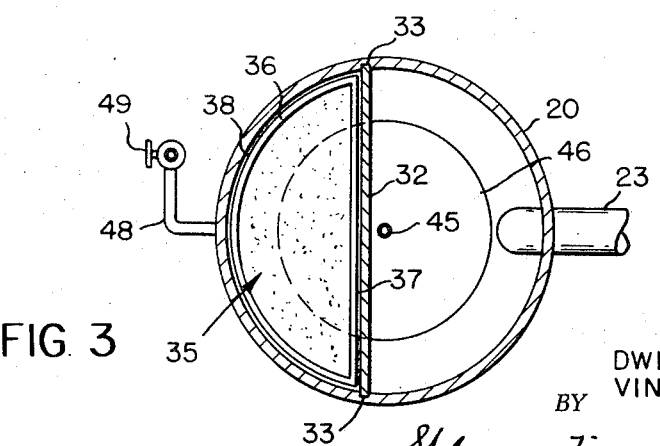
FIG. 3 is a fragmentary sectional view taken along the line 3—3 in FIG. 2 looking in the direction of the arrows.

Mounted in tank 20 between baffle 32 and the side of the tank containing the inlet opening 22 is a porous filter unit 35, comprising a rigid, hollow frame or housing 36, which is segmental cylindrical in configuration (FIG. 3). Frame 36 has a plane, vertical surface 37 confronting the baffle 32, and a curved surface 38 facing the inner surface of tank 20, and having a radius of curvature slightly less than the last-named surface.

Mounted horizontally in the filter frame 36 adjacent the lower end thereof is a layer 40 of aluminum or stainless steel screen. Mounted on top of this screen within frame 36 is a layer 41 of activated charcoal. Deposited on top of the charcoal layer 41 is a layer 42 of sand. Other materials, of course, may be used if desired.

The filter 35 is designed to float on the liquid that enters tank 20 from the pipe 21. For this reason frame 36 is made small enough to provide a slight clearance between its plane surface 37 and baffle 32, and between its curved surface 38 and the confronting inner surface of tank 20. Also, the overall height of the filter 35 should be less than the vertical distance separating the openings 22 and 24, so that even when the flow rate through the tank 20 is at a maximum, the filter 35 will float in tank 20 beneath the inlet opening 22, and will not rise high enough to block the inner end of pipe 21.

Secured intermediate its ends in an opening formed in the top of tank 20 adjacent the vent pipe 30, and extending downwardly through the center of the tank adjacent the baffle 32 is an ozone gas supply pipe 45. The lower end of pipe 45 is connected in the tank 20 to the center of a conventional ozone gas diffuser 46, which is mounted in any known manner in tank 20 to extend transversely beneath the lower edge of the baffle 32, so that substantial portions of diffuser 46 project laterally beyond opposite sides, respectively, of the baffle 32.

A further pipe 48 is connected at one end to the interior of tank 20 adjacent the lower end thereof, and at its opposite end is connected through a conventional gate valve 49 and pipe 47 to a hereinafter described supply of compressed air, which may be utilized periodically to blow down tank 20 to remove any solid wastes that may have collected in the bottom of the tank.

In use, and assuming continuous flow of partially treated liquid sewage through pipe 21 into the tank 20, the incoming liquid passes downwardly through filter 35, beneath the baffle 32, and then out of the discharge pipe 23 to any satisfactory outfall. During this time, ozone gas is supplied continuously through pipe 45 to the diffuser 46, which breaks down the ozone gas into small bubbles that rise upwardly through the liquid in the tank on both sides of the baffle 32. These ozone gas bubbles oxidize impurities in the liquid sewage, killing off all virus and bacteria, and also removing obnoxious odors.

Although substantial quantities of the ozone gas bubbles are absorbed by the liquid sewage during this purifying process, some excess ozone gas passes above the level L (FIG. 2) of the liquid in tank 20, and into the space in the upper end of the tank which is vented by the vent pipe 30. This excess ozone gas passes, at least in part, over the top of the baffle 32, so that the upper end of the filter 35 is exposed to ozone gas. Also, the lower end of the filter is exposed to the ozone gas that bubbles upwardly from that portion of the diffuser 46 that is positioned directly beneath filter 35, or to the left of the baffle 32 as illustrated in FIG. 2. Both the top and the bottom of the filter 35 are thus exposed to ozone gas, so that the filter itself is continuously purified during the operation of the system. The degree of concentration of ozone gas in the upper end of tank 20 will, of course, depend upon the rate that ozone gas is supplied to pipe 45, and the rate at which the upper end of tank 20 is exhausted by the vent 30.

The relative dispositions of the baffle 32 and the diffuser 46 cause incoming liquid sewage first to be exposed to rising bubbles of ozone gas during the passage of the liquid downwardly beneath the lower end of the baffle 32, and then cause further exposure of the liquid to ozone gas bubbles as the liquid passes upwardly from beneath the baffle 32 toward the outlet 23. This arrangement minimizes the size of the unit that will be necessary to maintain incoming sewage in contact with ozone gas for a predetermined period of time. Typically, the liquid sewage should be maintained in contact with the ozone gas for at least 10 minutes to enable proper purification of the liquid.

Periodically the cover 26 may be removed to provide access to the filter 35, so that the solids that have collected on top of the filter can be scraped from the layer of sand 42, and so that the sand can be replaced or replenished as required.

Figure 4:
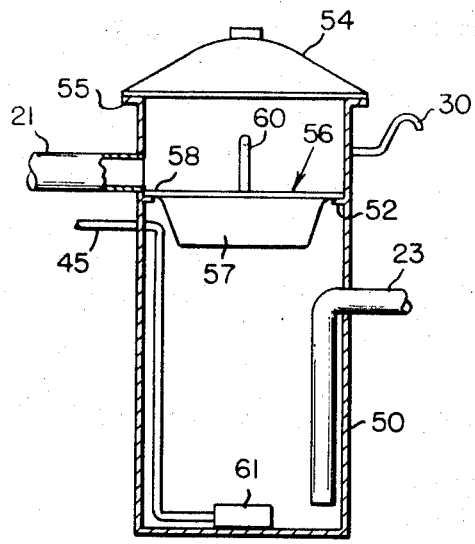
FIG. 4 is a fragmentary sectional view similar to FIG. 2 but illustrating a modification of the sewage purifying apparatus made in accordance with this invention.

Referring now to FIG. 4, wherein like numerals are employed to denote elements similar to those employed in the first embodiment, 50 denotes a tank, which may be made of materials similar to those employed in the construction of tank 20. Tank 50 also has a sewage inlet pipe 21, and an outlet pipe 23. In this embodiment, however, tank 50 is provided adjacent its upper end with an internal, circumferential shoulder 52, which is positioned just beneath the inner end of the inlet pipe 21. The open, upper end of tank 50 is sealed by a removable cover 54, which is releasably secured around its edge in any conventional manner to a flange 55 that surrounds the upper end of the tank.

Removably mounted in tank 50 beneath the cover 54 is a porous filter unit 56 comprising a hollow, generally cup-shaped housing 57 having around its upper end a circumferential flange 58 that is releasably and sealingly seated on the tank shoulder 52 so that all liquid entering the tank through pipe 21 must pass through filter 56 before reaching the outlet pipe 23. As in the case of filter 35, the filter housing 57 may contain superposed layers of screen, activated charcoal and sand, respectively, to function in a manner similar to that of filter 35. In addition, the housing 57 may be provided with a handle 60 for easing the removal of filter 56 for cleaning purposes, when the cover 54 has been removed.

Mounted in the bottom of tank 50 is a conventional ozone gas diffuser 61, which, as in the first embodiment, is connected by a pipe 45 to a supply of ozone gas. Also, the upper end of tank 50 is vented to atmosphere by a pipe 30, which communicates with the interior of the tank beneath cover 54, and above the filter unit 56.

In use, the sewage water is fed to the tank 50 by the pipe 21, so that the incoming water is filtered by unit 56 before passing into the bottom of tank 50, where it is ozonated or purified by the ozone gas bubbles that emanate by the diffuser 61. Any excess ozone gas, which is not absorbed by the liquid in tank 50, passes upwardly through the filter unit 56 to maintain the filter purified as in the first embodiment. The concentration of ozone gas in the tank above the filter 56 will, of course, depend upon the rate at which gas is exhausted through the vent 30.

Figure 5:
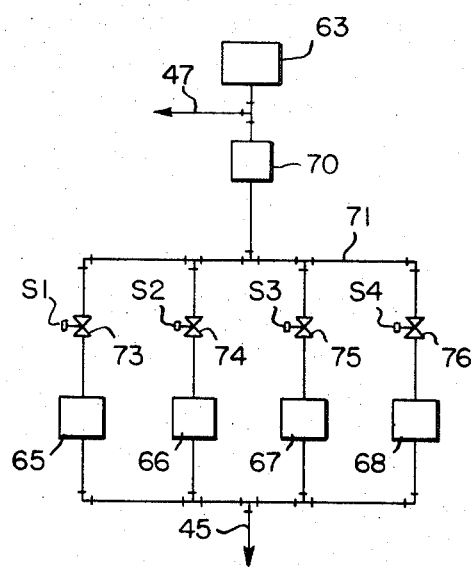
FIG. 5 illustrates diagrammatically the manner in which a plurality of ozone generators may be employed to supply ozone gas to the apparatus shown in FIGS. 1 to 4.

Referring now to FIG. 5, 63 denotes a conventional air compressor or pump, which may be employed to generate a supply of compressed air for the blow down line 47, and for each of a plurality of conventional ozone generators denoted at 65, 66, 67 and 68, respectively. The output of the compressor 63 is connected to line 47, and through a conventional air filter 70 to a supply line or pipe 71. Four normally closed solenoid-operated valves 73, 74, 75 and 76 are connected at one side to the compressed air supply line 71, and at their opposite sides to the compressed air inputs of the ozone generators 65, 66, 67 and 68, respectively. The outputs of these generators are connected to the ozone gas supply line 45, which provides ozone gas for the above-described contact tank 20 or 50.

Figure 6:
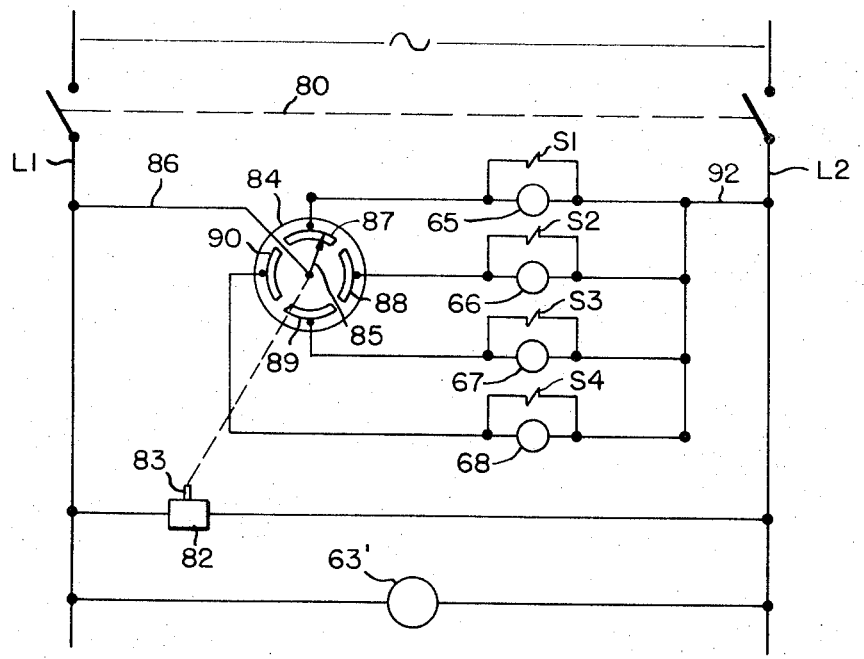
FIG. 6 is a wiring diagram illustrating one manner in which the ozone supply apparatus of this invention may be wired for operation.

Referring now to FIG. 6, L1 and L2 denote a pair of wires or lines that are adapted to be connected by a conventional ON-OFF switch 80 to an alternating current (AC) power source in any known manner. A timer 82 and the motor 63' for compressor 63 are connected in parallel between lines L1 and L2 to be energized whenever the switch 80 is closed. Timer 82 has an output shaft 83 that is operatively connected to a conventional stepper switch 84 having a rotatably indexible switch contact 85 that is connected by a line 86 to line L1. Contact 85, which is driven by the shaft 83 when the timer 82 is operating, is rotated successively into sliding engagement with four arcuate conductors or contacts 87, 88, 89 and 90, whic form part of the switch 84. The generators 65, 66, 67 and 68 are connected at one side by a common line 92 to the line L2, and at their opposite sides are connected to the contacts 87, 88, 89 and 90, respectively, so that upon each revolution of the switch contact 85 the generators 65 to 68 are actuated successively and one by one. In practice, it is desirable that none of the generators operate for more than several hours at a time.

The solenoids S1, S2, S3 and S4, which operate the valves 73, 74, 75 and 76, respectively, are connected in parallel (FIG. 6) with the generators 65, 66, 67 and 68, respectively, so that whenever one of the generators is energized, or actuated, the solenoid for the associated valve 73, 74, 75 or 76 will be energized to open that valve, so that compressed air will be supplied from the compressor 63 to the selected generator. Thus, when switch 80 is closed, the rotating contact 85 cyclically and successively energizes the four generators 65 to 68, thereby prolonging the lives of the generators and minimizing the shutdown time otherwise required to maintain the generators in the proper operating condition.

From the foregoing it will be apparent that the instant invention provides relatively simple and inexpensive means for purifying liquid sewage of the type that has already been subjected to a primary sewage treatment, so that the liquid is low in solid wastes, and therefore is capable of being purified by an ozonation process. In each of the disclosed embodiments the incoming sewage is mechanically filtered and chemically treated, or ozonated, to remove not only solid particles from the liquid, but also to oxidize impurities and to kill all virus and bacteria in the liquid before it is discharged from the system. Moreover, the ozone gas is delivered to the system in such manner that it tends not only to purify the liquid in the contact tank 20 or 50, but also tends to keep the filter 35 or 56 clean and free of obnoxious odors. To prevent undesirable sludge build up in the bottom of the tank, the blow down lines 47, 48 may be uitlized; and in the event that either filter 35 or 56 becomes clogged with solid waste, the filters can be removed and scraped, or otherwise cleaned and repaired, before being returned to the associated tank 20 or 50. Furthermore, by supplying ozone gas to both sides of the baffle 32, as illustrated in the first embodiment, not only is the filter 35 purified by the excess ozone gas that arises from beneath the filter, but also the incoming liquid sewage is subjected first to counterflow treatment by ozone gas bubbles, and then to further treatment after the liquid flows beneath the baffle 32 and into the right hand side of the tank as shown in FIG. 2.

While four ozone generators 65 to 68 have been described in connection with FIGS. 5 and 6, it will be understood that the invention may be practiced with two or more generators, provided the electrical controls operate each generator only intermittently, and for example, for no more than several hours at one time, and with at least several hours shut down time between successive operations. Moreover, heated desiccant driers may be used to remove objectionable moisture from the supply of air to the generators during their operation. The ozone generators may be of the commercially available type, for example the type made by Welsbach Corporation.

We claim:

1. Apparatus for purifying sewage effluent, comprising
   a tank having an inlet adjacent its upper end connected to a supply of liquid sewage effluent, and having an outlet spaced beneath said inlet,
   a baffle extending across said tank between said inlet and said outlet, and having a lower edge slightly above the bottom of said tank and an upper edge projecting above said inlet, whereby liquid sewage entering through said inlet must pass downwardly in said tank and beneath the lower edge of said baffle to reach said outlet.
   a porous filter for removing solids from the sewage water entering said tank,
   means mounting said filter in said tank beneath said inlet, and between said baffle and the portion of the tank containing said inlet, so that any liquid sewage entering the tank through said inlet must pass downwardly through said filter before passing beneath said baffle for discharge from the tank through said outlet,
   a diffuser mounted in said tank adjacent the lower end thereof, with at least a portion of said diffuser being positioned beneath and in registry with said filter,
   means of supplying ozone gas to said diffuser for distribution thereby into the liquid effluent in said tank in the form of small bubbles of ozone gas, and
   means for venting the upper end of said tank to atmosphere so that the level of the liquid in the tank normally is spaced beneath said upper end,
   said mounting means supporting said filter with the upper surface thereof confronting on the space formed in said tank above the level of the liquid in said tank, whereby said upper surface is exposed to any excess ozone gas that bubbles upwardly through said liquid to said space.

2. Apparatus as defined in claim 1, wherein said filter is buoyant, and is guided by said baffle and said portion of said tank to float therebetween on the surface of the liquid sewage in said tank.

3. Apparatus as defined in claim 1, wherein said diffuser extends beneath said lower edge of said baffle and laterally beyond opposite sides, respectively, of said baffle.

4. Apparatus as defined in claim 3 wherein
   said tank is cylindrical and said inlet and said outlet open on diametrically opposite sides, respectively, of said tank, said baffle comprises a vertical plate extending between opposite sides of said tank transverse to the axes of said inlet and said outlet, and said filter is segmental cylindrical in configuration, having a plane surface confronting said plate and an arcuate surface confronting said portion of the tank containing said inlet.

5. Apparatus as defined in claim 2, wherein said filter comprises a hollow housing containing superposed layers of metal screen, activated charcoal and sand, respectively.

6. Apparatus as defined in claim 1, wherein said means for supplying ozone gas comprises a plurality of ozone generators, means connecting the outputs of said generators to said diffuser, and control means for cyclically and successively actuating said generators one at a time thereby continuously to supply ozone gas to said diffuser.

7. Apparatus as defined in claim 6, including
a supply of compressed air, means for selectively connecting said compressed air supply to the interior of said tank adjacent said lower end thereof, and means responsive to said control means selectively to connect said compressed air supply to the input of the ozone generator actuated by said control means.

8. Apparatus for purifying sewage effluent, comprising a tank having an inlet connected to a supply of liquid sewage, and an outlet for discharging the sewage from said tank after it has been purified, a porus filter mounted in said tank transverse to the path of flow of sewage through the tank to filter solids from the sewage before it is discharged from said outlet, means including a diffuser for bubbling ozone gas into said sewage after it has passed through said filter, and during the flow of said sewage toward said outlet, thereby to purify said sewage, said tank having therein a chamber disposed to receive excess ozone gas that is bubbled through said sewage without being absorbed thereby, said filter having a portion thereof contronting on said chamber to be exposed to said excess ozone gas therein, and a baffle mounted in said tank between said inlet and said outlet and operative to cause sewage passing through said tank to flow first in one direction from said inlet toward said diffuser, and then in the opposite direction from said diffuser toward said outlet, said filter being disposed between said baffle and the side of said tank containing said inlet thereby to filter said sewage during the flow thereof in said one direction.

9. Apparatus as defined in claim 8, wherein said means for bubbling ozone gas into said sewage further comprises a plurality of ozone generators having their outputs connected to said diffuser to supply ozone gas thereto, and electrical control means for intermittently actuating said generators one at a time.

* * * * *